Figure 5:
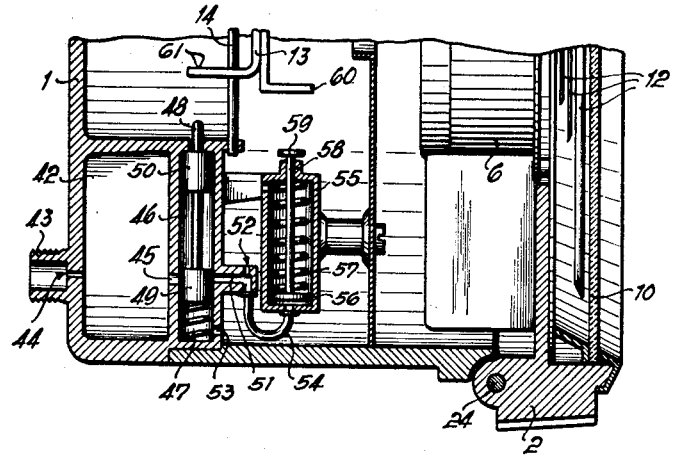

April 19, 1960
P. RIEGGER ET AL
2,933,363
METHOD AND APPARATUS FOR THE EVALUATION OF TACHOMETER DIAGRAMS
Filed Feb. 4, 1955
3 Sheets-Sheet 1
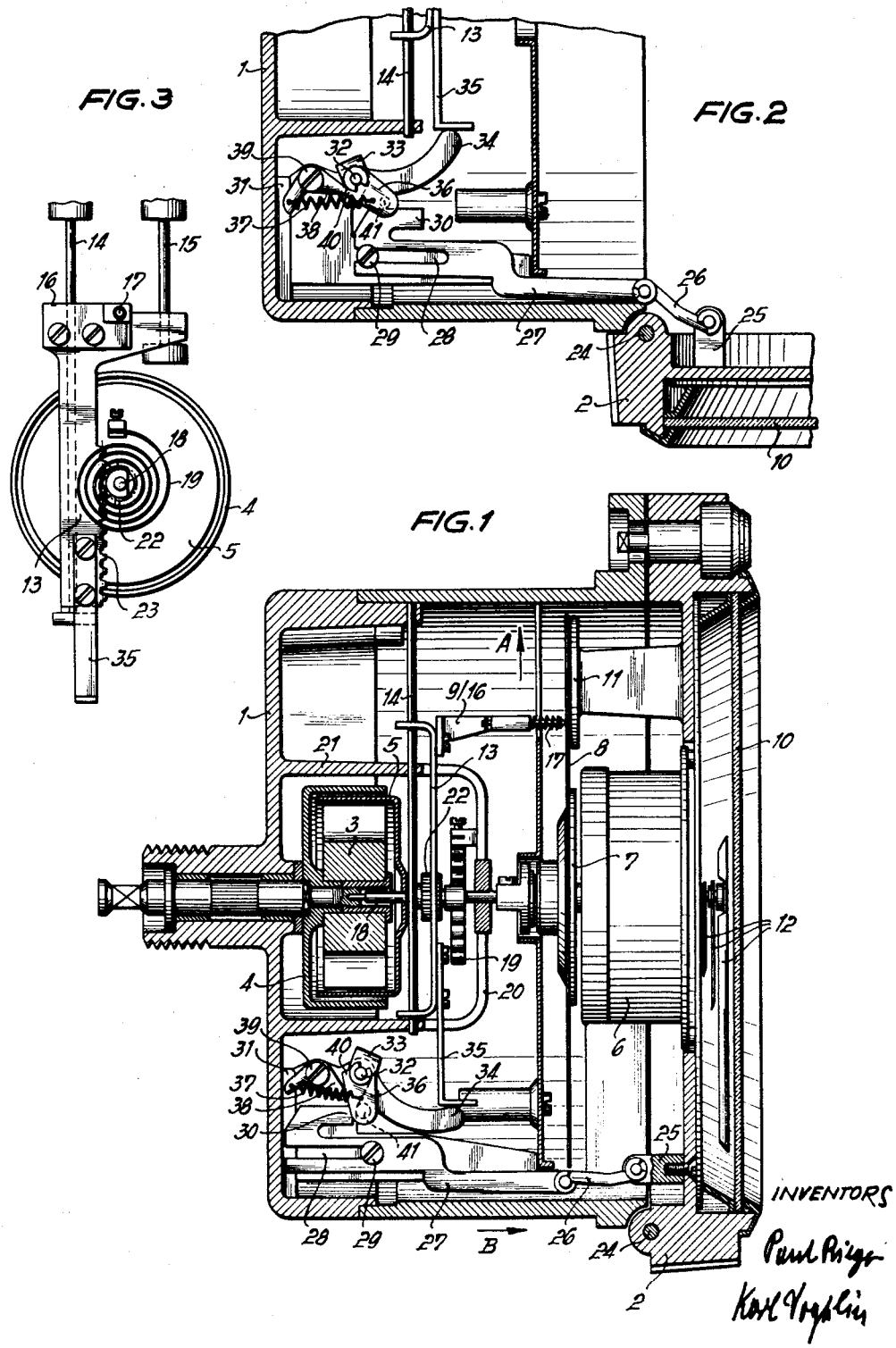
INVENTORS
Paul Riegger
Karl Hopflin April 19, 1960 P. RIEGGER ET AL 2,933,363
METHOD AND APPARATUS FOR THE EVALUATION
OF TACHOMETER DIAGRAMS
Filed Feb. 4, 1955 3 Sheets-Sheet 3
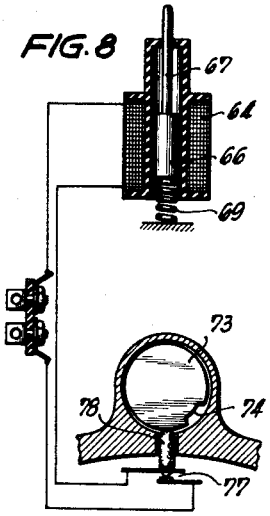
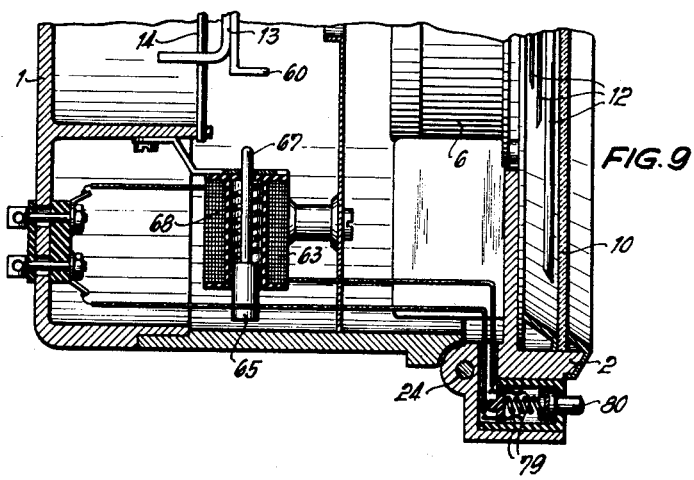
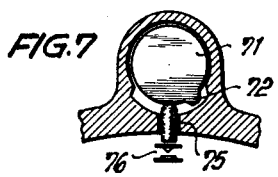
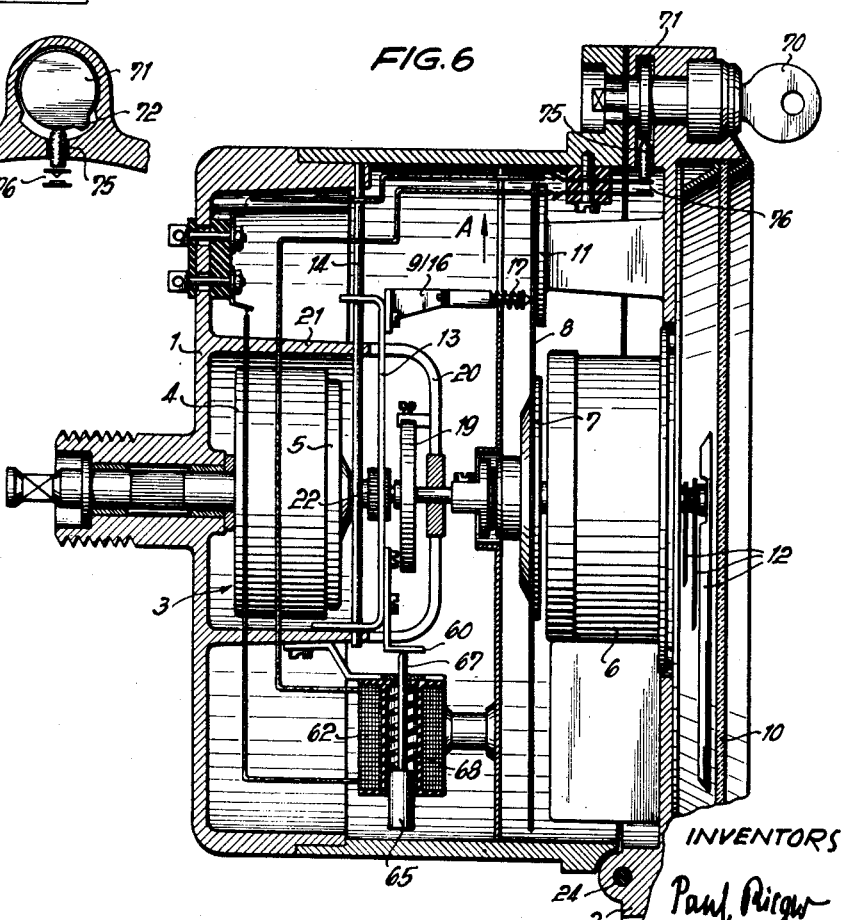
INVENTORS
Paul Riegger
Karl Voglin

United States Patent Office 2,933,363
Patented Apr. 19, 1960

2,933,363

METHOD AND APPARATUS FOR THE EVALUATION OF TACHOMETER DIAGRAMS

Paul Riegger and Karl Vögtlin, Villingen, Germany, assignors to Kienzle Apparate G.m.b.H., Villingen, Schwarzwald, Germany Application February 4, 1955, Serial No. 486,222

Claims priority, application Germany February 8, 1954

14 Claims. (Cl. 346—23)

Recording tachometers are apparatus for the recording of the number of revolutions per unit time of machines and vehicles. In particular they serve to supervise the driving habits of drivers of any type of vehicle, especially of self-propelled vehicles. The records, which are usually disc-shaped, indicate clearly time, frequency and amount of acceleration and deceleration, driving speed as well as other data. It is known that uniform driving at fairly constant, comparatively low average speed is of great importance for the amount of fuel used, the wear of tires and other wear and tear.

In recent years, the disc records have been used, to an increasing extent, to establish the cause of accidents. In these instances, the velocity, the acceleration and the deceleration of the vehicle at and prior to the accident are of primary importance in the decision as to the cause of the accident. Exact evaluation and careful consideration are required to obtain these data from the diagram; the court decision depends to a large extent, sometimes exclusively, on these data.

The most important values are the increase and decrease in velocity per unit time, i.e., acceleration and deceleration. It may also be important to compute on the disc diagram the path from the position at which the accident occurred to the position at which the particular vehicle stopped, and to find the above-mentioned values at the position at which the accident occurred.

Since the diagram discs, driven by a clockwork, rotate with constant angular velocity, it appears simple, at first inspection, to calculate (a) the respective time intervals elapsed between designated points on the velocity curve by measuring the lateral distances of these points and possibly of intermediate points from one of the radii representing time, (b) from the change in velocity during associated time intervals the acceleration or deceleration, and (c) the associated paths.

Exact measurements on the disc records are very difficult, since the angular velocity of the disc, provided it completes one revolution in 24 hours, is very low, and the extension of the velocity field is rather limited. These difficulties are met by microscopic and photographic enlargements. However, these reveal clearly that, due to the unavoidable inaccuracies in manufacturing and mounting and due to play during operation, in operation the pencil guide only rarely corresponds in operation exactly to the radii of the diagram disc and these radii are, therefore, unsuitable as reference lines.

It is the merit of the present invention to have recognized these difficulties and to have found means to overcome them.

The invention is concerned with a method avoiding the above-mentioned inaccuracies of recording by providing on the diagram disc to be evaluated one or several velocity lines corresponding, for instance, to "infinite" acceleration or deceleration and characteristic of the particular tachometer, and measuring from these lines. These reference lines replace the time radii not suitable for the particular instrument; they will be designated as "reference lines." This invention contemplates different possibilities for the recording of these reference lines. Each reference line constitutes a polar axis of a system of polar coordinates in which the length of radial vectors indicates the speed or velocity, and in which the angle between each radial vector and the polar axis represents the time.

If after the accident the tachometer of the vehicle is available, the diagram disc contained in the tachometer during the accident may be placed into the tachometer, the advance mechanism for the diagram disc held inoperative, and the main drive of the tachometer accelerated to the highest velocity of the apparatus or at least to a velocity sufficiently high to establish the direction of the reference line and then decelerated to zero velocity. Thus the instrument records on the disc the desired reference line at a selected position as close as possible to the curve under consideration, thereby eliminating the inaccuracies due to manufacturing and mounting.

To compensate for the play during operation, it may be advisable to accelerate the apparatus with maximum acceleration on a test stand, and with the disc diagram drive in operation, to the maximum velocity or to a sufficiently high velocity value, and to decelerate as rapidly as possible to zero value of velocity. Since, in view of the low angular velocity of the disc, the maximum velocity and the zero velocity are obtained practically immediately, the reference line thus recorded is sufficiently accurate.

The just described method is not possible if the tachometer has been rendered inoperative or if its operation has been impaired by the accident; if it was operated for a long time after the accident, possibly has run out in the meantime, or if it is for some reason not available any more. Then the reference line must be established from the record on the respective diagram disc.

The record on the disc will as a rule contain one or more curve sections which correspond to a sudden stoppage, caused for instance by a sudden obstacle, or to a sudden acceleration, as the case may be. The corresponding steeply increasing and decreasing curve sections may very well be used for the establishment of the reference line, particularly if several such steep curve sections are available. However, it must be taken into consideration that the accelerations are as a rule smaller than the decelerations. Hence, the reference line may be found from the direction of these opposing steep sections by drawing it as a line having a direction intermediate these directions closer to the direction of the deceleration section.

This invention suggests a particular method for the establishment of the reference line applicable to instruments controlled by a centrifugal pendulum, which method has already proved valuable and entirely satisfactory in practice. As is well known, a centrifugal pendulum does not respond to low angular velocities. Hence, in a registering tachometer with centrifugal pendulum the velocity reading reduces almost immediately to zero as soon as this velocity value, usually about one fifth of the maximum velocity, is reached. Thus the pencil traces a straight line to the zero line. The just mentioned section of the velocity curve represents "infinite" deceleration, i.e., it may be used as the reference line for the particular instrument and the particular disc record.

The present invention utilizes this fact. The velocity of a vehicle frequently decreases to the critical value and it will do this with great probability at or after an accident. Hence, in the case of a centrifugal pendulum mechanism there are almost always several such line sections and they occur more particularly in the vicinity of the position on the velocity record which is under consideration.

As a safety measure, the previously described method may be used for comparison purposes.

In registering tachometers where the measuring instrument is based on the eddy current principle, a rapid decrease of the velocity curve to zero occurs, in general, at lower velocity values. It is feasible to apply the previously described method to this type of instrument. However, in practice this is impossible, since eddy current instruments exhibit no sudden decrease to zero in the low velocity region but are comparatively inaccurate and nonlinear. For this type of instrument it is therefore strongly recommended to trace one or several reference lines, as previously described.

Since it is unpredictable which apparatus and which diagram disc will be involved in an accident evaluation, the invention suggests to supply each new or repaired recording tachometer with at least one disc with reference lines traced on the test stand. This will provide at least an indication of the probable course of the reference line on later inserted diagram discs by comparison with the sample disc. Alternatively, a reference line may be derived by taking the average of the steeply increasing and decreasing line sections on several discs traced by the same apparatus before the accident.

The invention further proposes to have the apparatus trace at least one reference line on each diagram disc when the disc is inserted into the apparatus. To secure these lines, the invention suggests to provide means in the recording tachometer which automatically record one or more reference lines on the diagram discs. For instance the cover of the tachometer may be provided with a system of levers or other motion transferring means which, upon opening and/or closing of the cover, guide the recording pencil once to the maximum or to a sufficiently high value of the velocity trace and back again. This is easily accomplished if the pencil, as is customary, is forced towards zero velocity position by one or several springs and is led outwardly by the measuring instrument. In this case the transfer mechanism operated by the cover releases the pencil at the end of the cover-closing motion and permits the pencil to return by the action of the above-mentioned springs to the control member of the measuring instrument. Alternatively, it is possible to move the tracing pencil into the desired position on opening of the cover, and to retain it in this position, for instance by means of a latch, until the cover is completely or almost closed. Upon contact with the diagram disc the pencil may be released by a special release operative at this instant and controlled by the cover, the cover lock or the cover closure; the pencil writes the reference line on its return to the zero position.

This embodiment is especially suitable for recording tachometers where the diagram disc is secured to the cover and the tracing pencil is located in the housing or vice versa, since in these apparatus opening of the cover immediately lifts the diagram disc away from the tracing pencil and contact with the pencil is reestablished only when the cover is tightly closed.

To avoid damage through the rapid return of the tracing pencil, damping means may be provided thereon.

The lever mechanism may be replaced with a cam drive, an electromagnetic or a pneumatic operating mechanism. The pencil movement may be controlled by the apparatus key if the lock is suitably connected with a displacing member. The just described embodiment has the advantage that each opening of the apparatus is indicated by a reference line. The marking mechanism heretofore used for this purpose may be omitted.

To overcome the difficulty that, under certain conditions, only one or a few reference lines are traced, and that the record section to be evaluated is displaced by a large angle from these lines, it may be advisable to build in an apparatus which causes reference lines to be traced from time to time during the rotation of the disc, for instance after each quarter or half revolution. Since the positions of these traces are predetermined, they will hardly interfere with the record.

A further measure to secure a reference line may be an optionally operable apparatus for the tracing of a reference line, for instance by means of a push button with instantaneous spring action. If such an apparatus is provided it is recommended that the driver of a vehicle involved in an accident operate the push button after the accident.

It is further possible to automatically release the apparatus upon stoppage of the vehicle. In electrically operated tachometers this is easy, since, when reaching the zero line, the tracing pencil or its supporting member may close a contact to operate an electromagnetically controlled movable member.

In mechanically operated tachometers a stored force may be provided which may be wound from a branch of the velocity or path gear system or from the pendulum and released at the desired instant.

The presence of an apparatus which, upon opening of the cover or by the associated key motion causes the tracing of a reference line has the advantage that with great probability a reference line will appear close to the section of the record corresponding to an accident, since the officer reporting the accident is required, or should be required, to take the diagram disc from the apparatus to assure proof, at least in severe accidents.

Below there are described some examples for the apparatus with means for drawing up reference lines according to the invention which are illustrated in the accompanying drawings. The drawings show in Fig. 1 an eddy current recording tachometer with its cover shut, including means for drawing up a reference line operable by a lever arrangement when opening the cover, Fig. 2 a partial view of Fig. 1 with the cover being open, Fig. 3 the drive for the recording device, Fig. 4 an eddy current recording tachometer with pneumatically operable means for drawing up a reference line, the latter being shown before being actuated, Fig. 5 the same device in partial view after having been actuated, Fig. 6 an eddy current recording tachometer with means electromagnetically operable by the key of the cover in neutral position, Fig. 7 details of the switching device for the electromagnet operated by the key of the cover, Fig. 8 a variation of the switching device according to Fig. 7, and Fig. 9 a partial view of a recording tachometer with means electromagnetically operable by a push button.

The recording tachometer shown in Figs. 1 to 3 comprises a casing 1, a movable lid 2, a speedometer 3 working according to the eddy current principle, a stator 4 to be driven by the vehicle gear and a rotor 5 projecting into said stator 4. A diagram disc 8 is supported by a disc 7 uniformly rotated by a clockwork 6; furthermore, a recording device 9 is provided which is driven by the measuring device 3. The lid 2 is closed by a glass plate 10 on the upper side, and contains a writing table 11 and the various hands 12 for indicating the time and the driving speed.

The recording device 9 consists—see Fig. 3—of a stirrup 13, which is axially movable along a bar 14 fixedly mounted in the casing 1 and which is additionally guided by a bolt 15 fastened to the casing, and of a support 16 fastened to the stirrup 13 for the recording pencil 17 this latter being spring-mounted to the support 16.

The shaft 18 of the rotor 5 is under the action of a re-adjusting spring 19 which is fastened to the stirrup 20 of a pot-shaped bottom part 21; also on the shaft 18 there is a pinion 22, which engages with the teeth 23 of the stirrup 13.

As soon as the vehicle, supervised by the illustrated recording device, starts to move, the stirrup 13, and with this also the writing means 17, is shifted in the direction of the arrow A and the recording pencil will draw up the speed on the diagram disc 8.

The device described now serves for drawing up the reference line: Inside the lid 2, adjacent to the hinge 24, a post 25 is screwed on, to which the intermediate link 26 is attached. This link is connected to a flat slide 27 having an arm 30; by means of a slot 28 and a screw 29, slide 27 is made to run approximately parallel to the side wall of the casing 1. On a post 31 of the bottom of the casing 1, a two-armed U-shaped lever 33 is mounted swinging about an axial bolt 32. The right arm 34 of the lever 33 engages an angular strip 35 screwed to the stirrup 13, its upper arm 36 being under the action of the spring 37, which tends to turn it in clockwise direction. It is fastened to a two-armed pawl 38, swivelling about an axial bolt 39 on the post 31 and, in a certain position, is capable of blocking the lever 33 at its right arm 34 against a shoulder 40. The spring 37 presses a bolt 41 of the upper arm 36 of the lever 33 toward the arm 30 of the slide 27.

This device works as follows: When the cover 2 is shut—see Fig. 1—the pawl 38 and the lever 33 with its bolt 41 are at rest and do not affect the recording device 9, this device now being operated only by the speedometer 3.

When the lid 2 is opened—see Fig. 2—the slide 27 is shifted to the right by means of the intermediate link 26, thus engaging the bolt 41 with its arm 30. Thereby the lever 33 is moved in counter clockwise direction, against the spring 37, until the pawl 38 with its right arm will block the lever 33 at the shoulder 40. When the lever 33 moves, its arm 34 rocks the stirrup 13 and thereby also the recording device in the direction of the arrow A. The transmission ratio of the lever arrangement is so chosen, that this movement will be performed very quickly and that the recording pencil 17 will draw up the reference-line on the diagram disc 8, before the lid 2 will be fully opened. When shutting the lid 2, for example after putting in a new diagram disc 8, the slide 27 engages with its lower rim the pawl 38 at its left arm, so that the right arm of this pawl is lifted off the shoulder 40 of the lever 33 thereby releasing the latter. Consequently the readjusting spring 19 can now pull back the stirrup 13 into its initial position, and the recording device will again draw up a reference-line.

Figure 4:
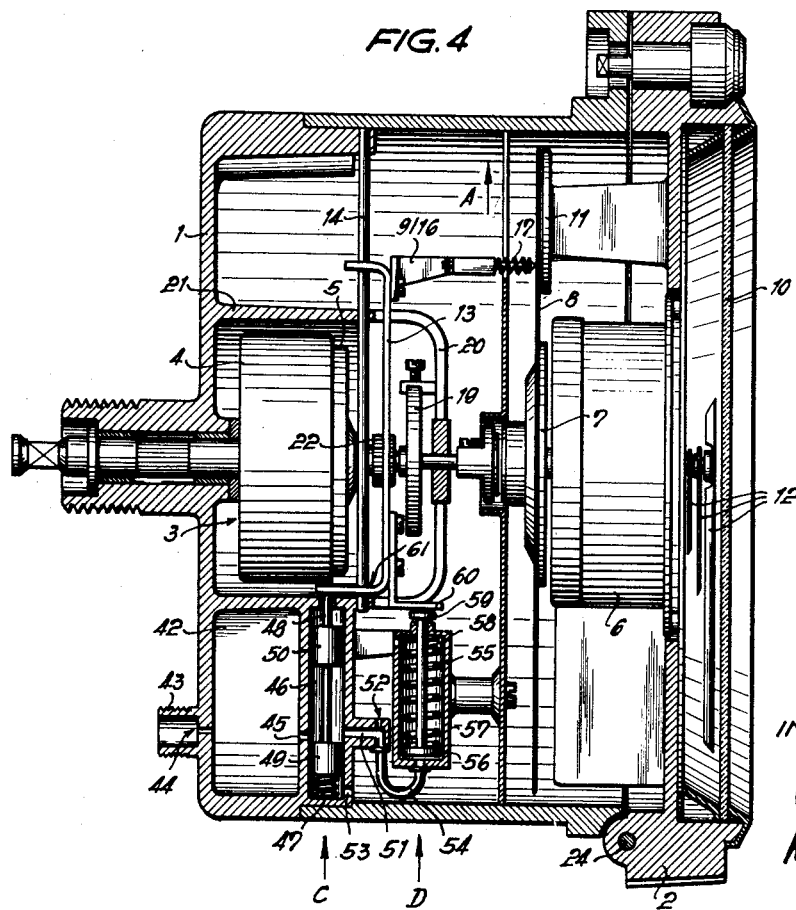

The recording tachometer as shown in Figs. 4 and 5 is provided with pneumatically operated means for drawing up a reference-line, which means is actuated as soon as the driving speed reaches the value 0. For this purpose a main container for the pneumatic medium is required, such as provided in many motor vehicles, especially in trucks and busses.

On the bottom of the casing 1 an additional container 42 is arranged, which is connected to the main container by means of a short tube 43 and by a usual conduit (not shown in the drawings), for example a compressed air hose. The additional container 42 is connected to the control cylinder 46 by an opening 45. In the control cylinder 46 there are two controlling pistons 49 and 50 connected to each other by a common piston bar 48 and being under the action of a spring 47 tending to press the pistons in the direction of the arrow C.

In the position of the pistons shown in Fig. 4 the opening 45 enters the cylinder 46 just above the piston 49 and exactly opposite to another opening 51. There is yet another opening 52 behind the opening 51, its diameter being considerably bigger than that of the inlet opening 44. Below the lower piston 49 there is a comparatively large air outlet 53.

Fitted to the opening 51 there is a conduit 54 which connects the control cylinder 46 with the operating cylinder 55 and which opens into the latter below a piston 56 controlled by a spring 57.

Fastened to a piston bar 58, but outside of the operating cylinder 55, there is a stop plate 59, which cooperates with an angle 60 fastened to the stirrup 13. The end of the piston bar 48 projects from the control cylinder 46 into the path of an extension 61 of the stirrup 13.

The above described device operates as follows: At the start of the recording device, the stirrup 13 moves in the direction of the arrow A. Thereby arm 61 releases the end of the piston bar 48 projecting from the control cylinder 46, and the spring 47 presses the pistons 49 and 50 upwards in the direction of the arrow C. The piston 49 shuts the openings 45 and 51 (see Fig. 5). Since no air can now leave the additional container 42 through the openings 45 and 52, that container 42 fills up steadily under the pressure of the main container of the vehicle.

When the vehicle stops, the stirrup 13 moves downwards and presses down the piston bar 48 with its arm 61 so that the pistons 49 and 50 reach the position shown in Figure 4. Thereby the openings 45 and 51 are opened, the pneumatic medium stored under high pressure in the additional container 42 enters the working cylinder 55 under the piston 56 through the conduit 54, thus thrusting the piston 56 suddenly upwards in the direction of the arrow D against the action of the spring 57.

The stop plate 59 of the piston bar 58 strikes against the angle 60 of the stirrup 13, so that the latter will also be moved in the direction of the arrow A and the recording pencil 17 draws up the desired reference line on the diagram disc 8. By this movement of the stirrup 13 the piston bar 48 is released as described above and the piston 49, by moving upwards again, shuts the openings 45 and 51.

Immediately after the reference-line has been drawn, the piston 56 slides downwards under the action of the spring 57, and thereby displaces the air through the opening 52. The stirrup 13, too, is promptly drawn back by the re-adjusting spring 19, so that its arm 61 pushes back the piston bar 48, and the piston 49 opens the openings 45 and 51.

Since the opening 44 is very small the additional container 42 cannot fill up within the short time during which the openings 45 and 51 are closed for drawing up the reference line. When they are open, the pneumatic medium pouring into the additional container 42 from the main container through the opening 44, can flow off through the opening 52. As the opening 44 is much smaller than the opening 52, no pressure can build up in the additional container. Therefore the piston 56 will remain at rest. Only when the vehicle begins to move and the piston 49 shuts the opening 45 the additional container is newly filled up, so as to be capable of causing the drawing of the reference line when the vehicle stops.

If it is not desired to use the device whenever the speed reaches the value 0, a control valve operated by hand or automatically at definite intervals can be switched into the conduit to the tube 43.

Naturally it is possible to modify the above described embodiment of the invention operating with a pneumatic medium into one working with an hydraulic medium. This manner being known to all skilled in the art needs no particular description.

In the embodiment of the invention as shown in Figs. 6 to 9 the quick movement of the stirrup 13 is effected by electromagnets 62, 63 and 64 which transfer their impulses upon angle 60 of the stirrups 13 by means of push rods 67 fastened to magnet armatures 65 and 66. In the embodiments according to Figures 6, 7 and 9 the armatures 65 of the magnets 62 and 63 are pulled into the coils, against an action of the spring 68, when the electromagnets are actuated, thereby operating the stirrups 13.

In the embodiment according to Fig. 8, however, i.e. the circuit of the coil current is normally closed and keeps the core 66 in its ineffective position against the action of a spring 69. Only when the circuit of the coil current is interrupted, can the magnet act upon the stirrup 13 under the action of the spring 69.

According to Figures 6 to 8 the key 70 of the lid 2 serves for switching on and off. When shutting the lid this key 70 turns a cam 71 with a detent 72—see Fig. 7—or a cam 73 with a recess 74—see Fig. 8.

On being turned the cam 71, by means of its detent 72, moves an insulating button 75 and closes for a short time the normally open spring contact 76 of the feeding circuit of the electromagnet 62. On the other hand, the cam 73, on being turned, separates the spring contact 77 in the feeding circuit of the magnet 64 for a short period of time by means of its recess 74 moving an insulating button 78. In the embodiment according to Fig. 9 the contacts 79 in the feeding circuit of the electromagnet 64 can be closed by means of a spring-mounted button 80.

The invention shall not be confined to the embodiments shown. It is within the scope of the invention to combine in various ways the details of all the embodiments of the device and to modify them according to the experiences made up to date.

We claim:

1. A recording tachometer comprising, in combination, a casing; a rotary support mounted in said casing and adapted to support a record carrier; means for rotating said support at a slow uniform speed; a recording member mounted in said casing for movement in radial direction of said support and adapted to record on a record carrier supported on said support; tachometric means mounted on said casing and operatively connected to said recording member for moving the recording member between two end positions respectively associated with standstill of the vehicle and maximum speed of the vehicle so that during operation of the vehicle a velocity-time graph is recorded on the record carrier; and actuating means mounted on said casing and operatively connected to said recording member for rapidly moving said recording member independently of the operation of said recording member by said tachometric means from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals.

2. A recording tachometer comprising, in combination, a casing having a cover movable between an open position and a closed position; a rotary support mounted on said cover; and adapted to support a record carrier; means for rotating said support at a slow uniform speed; a recording member mounted in said casing for movement in radial direction of said support and adapted to record on a record carrier supported on said support; tachometric means mounted on said casing and operatively connected to said recording member for moving the recording member between two end positions respectively associated with standstill of the vehicle and maximum speed of the vehicle so that during operation of the vehicle a velocity-time graph is recorded on the record carrier; and actuating means connected to and operated by said cover during movement of the same between said positions, said actuating means rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals.

3. A recording tachometer comprising, in combination, a casing having a cover movable between an open position and a closed position; a rotary support mounted on said cover; and adapted to support a record carrier; means for rotating said support at a slow uniform speed; a recording member mounted in said casing for movement in radial direction of said support and adapted to record on a record carrier supported on said support; tachometric means for moving the recording member between two end positions respectively associated with standstill of the vehicle and maximum speed of the vehicle so that during operation of the vehicle, a velocity-time graph is recorded on the record carrier; actuating means connected to and operated by said cover and being connected to said recording member for moving said recording member from one end position associated with standstill to the other end position associated with maximum speed during movement of said cover to said open position, and for moving said recording member rapidly from said other end position to said one end position when said cover is closed at a speed corresponding at least to maximum acceleration, or deceleration, of the vehicle whereby after insertion of a new record carrier a reference line representing a true polar axis for the recorded velocity-time graph is recorded on the record carrier so that arcs between points of said graph and said reference line accurately represent time intervals.

4. A tachometer as set forth in claim 3 and including locking means for locking said actuating means, said locking means being engaged and released by said cover in said closed position of the same, said recording member being spring loaded so as to move to said one end position upon release of said locking means.

5. A recording tachometer comprising, in combination, a casing; a rotary support mounted in said casing and adapted to support a record carrier; means for rotating said support at a slow uniform speed; a recording member mounted in said casing for movement in radial direction of said support and adapted to record on a record carrier supported on said support; tachometric means mounted on said casing and operatively connected to said recording member for moving the recording member between two end positions respectively associated with standstill of the vehicle and maximum speed of the vehicle so that during operation of the vehicle a velocity-time graph is recorded on the record carrier; and actuating means for rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals, said actuating means including a container for a fluid mounted in said casing, means for connecting said container to a source of pressurized fluid, a cylinder mounted on said casing, a spring loaded piston mounted in said cylinder and having a portion projecting from said cylinder and engaging said recording member, conduit means mounted on said casing and connecting said container with said cylinder, and valve means in said conduit means operated by said recording member so that in the end position of said recording member associated with standstill of the vehicle, pressurized fluid is supplied to said cylinder whereby said piston is operated to engage said recording member for moving the same rapidly to the other end position thereof.

6. A tachometer as set forth in claim 5 and including means mounted on said casing and having a discharge opening for discharging fluid from said container at a slower rate than the fluid is supplied to said container; and wherein said valve means closes said discharge opening under control of said recording member when the same moves out of the end position associated with standstill of the vehicle whereby pressure is built up in said container at the beginning of every start of the vehicle and reference lines are recorded at every stop of the vehicle.

7. A recording tachometer comprising, in combination, a casing; a rotary support mounted in said casing and adapted to support a record carrier; means for rotating said support at a slow uniform speed; a recording member mounted in said casing for movement in radial direction of said support and adapted to record on a record carrier supported on said support; tachometric means mounted on said casing and operatively connected to said recording member for moving the recording member between two end positions respectively associated with standstill of the vehicle and maximum speed of the vehicle so that during operation of the vehicle a velocity-time graph is recorded on the record carrier; and fluid-operated actuating means mounted on said casing and operatively connected to said recording member for rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals.

8. A recording tachometer comprising, in combination, a casing; a rotary support mounted in said casing and adapted to support a record carrier; means for rotating said support at a slow uniform speed; a recording member mounted in said casing for movement in radial direction of said support and adapted to record on a record carrier supported on said support; tachometric means mounted on said casing and operatively connected to said recording member for moving the recording member between two end positions respectively associated with standstill of the vehicle and maximum speed of the vehicle so that during operation of the vehicle a velocity-time graph is recorded on the record carrier; and electromagnetic actuating means mounted on said casing and operatively connected to said recording member for rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals.

9. A recording tachometer comprised, in combination of a casing having a cover movable between an open position and a closed position; a key operated lock on said cover including a cam means movable to an operative position, and adapted to be moved to said operative position under control of a key; a rotary support mounted on said cover and adapted to support a record carrier; means for rotating said support at a slow uniform speed; a recording member mounted in said casing for movement in radial direction of said support and adapted to record on a record carrier supported on said support; tachometric means mounted on said casing and operatively connected to said recording member for moving the recording member between two end positions respectively associated with standstill of the vehicle and maximum speed of the vehicle so that during operation of the vehicle a velocity-time graph is recorded on the record carrier; and electromagnetic actuating means mounted on said casing and operatively connected to said recording member, said electro-magnetic actuating means including a switch means controlling the energizing of said electromagnetic means, and being actuated by said cam means in said operative position, said electromagnetic actuating means, when energized, rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals.

10. A recording tachometer as set forth in claim 9 wherein said recording member is spring loaded and tends to move to one end position associated with standstill; wherein said electromagnetic actuating means move said recording member toward the other end position thereof when energized; and wherein said switch means is closed when said cam means is in said operative position.

11. A recording tachometer as set forth in claim 9, wherein said recording member is spring loaded and tends to move to one end position associated with standstill; wherein said electromagnetic actuating means includes an armature, and a spring means urging said armature to engage said recording member and to move the same to the other end position thereof, said electromagnetic means holding said armature against the action of said spring means, when energized; and wherein said switch means is opened in said operative position of said cam means so that said electromagnetic means is de-energized and releases said armature for operation of said recording member.

12. A recording tachometer comprising, in combination, a casing having a cover movable between an open position and a closed position; a rotary support mounted on said cover; and adapted to support a record carrier; means for rotating said support at a slow uniform speed; a recording member mounted in said casing for movement in radial direction of said support and adapted to record on a record carrier supported on said support; tachometric means for moving the recording member between two end positions respectively associated with standstill of the vehicle and maximum speed of the vehicle so that during operation of the vehicle a velocity-time graph is recorded on the record carrier; and means connected to and operated by said cover during movement of the same between said positions, said actuating means rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals, said actuating means including a movable member engaging said recording member for moving the same, and a linkage connected to said cover and engaging and operating said member during opening of said cover.

13. A recording tachometer comprising, in combination, a casing having a cover movable between an open position and a closed position; a rotary support mounted on said cover; and adapted to support a record carrier; means for rotating said support at a slow uniform speed; a recording member mounted in said casing for movement in radial direction of said support and adapted to record on a record carrier supported on said support; tachometric means for moving the recording member between two end positions respectively associated with standstill of the vehicle and maximum speed of the vehicle so that during operation of the vehicle a velocity-time graph is recorded on the record carrier; a spring urging said recording member to said end position associated with standstill of the vehicle; and actuating means connected to and operated by said cover during movement of the same between said positions, said actuating means rapidly moving said recording member from one of said end positions toward the other of said end positions at a speed corresponding at least to maximum acceleration, or deceleration, of the vehicle whereby a reference line representing a true polar axis for the recorded velocity-time graph is recorded on the record carrier so that arcs between points of said graph and said reference line accurately represent time intervals, said actuating means including a pivoted member mounted in said casing and cooperating with said recording member, a slide member movable between two positions for actuating said pivoted member to move said recording member from said end position associated with standstill of the vehicle to its other end position when said cover is opened, said slide member being connected to and operated by said cover, a spring loaded locking member for locking said pivoted member in a displaced position in which said recording member is held by said pivoted member in said other end position while said cover is open, said spring loaded locking member being engaged and shifted by said slide member in said closed position of said cover so as to release said pivoted member so that said recording member rapidly returns to said end position associated with standstill of the vehicle under the action of said spring.

14. In a method of evaluating a velocity-time graph, the steps of mounting a record carrier in a specific recording tachometer for rotation about an axis; and moving the recording member of said tachometer at a speed exceeding the maximum expected recording speed of said recording member in substantially radial direction with respect to said axis while in contact with said record carrier to record a reference line on said record carrier representing a true polar axis for a velocity-time graph recorded on said record carrier by said recording member during rotation of said record carrier so that circular arcs between points of said graph and said reference line, and extending substantially at right angles to said reference line, accurately represent time intervals irrespective of the position of said axis relative to a system of polar coordinates provided on said record carrier.

References Cited in the file of this patent

UNITED STATES PATENTS

| | | |
|---|---|---|
| 644,743 | Karlik | Mar. 6, 1900 |
| 814,071 | Nissim | Mar. 6, 1906 |
| 1,061,121 | Quertier | May 6, 1913 |
| 1,198,953 | Phelps | Sept. 19, 1916 |
| 1,277,359 | Barrett | Sept. 3, 1918 |
| 2,244,653 | Meer | June 3, 1941 |
| 2,464,612 | Rich | Mar. 15, 1949 |

FOREIGN PATENTS

| | | |
|---|---|---|
| 9,804 | Great Britain | of 1909 |
| 847,472 | France | Oct. 10, 1939 |